United States Patent
Suetsugu et al.

(10) Patent No.: US 9,103,044 B2
(45) Date of Patent: Aug. 11, 2015

(54) ELECTROLYTIC MANGANESE DIOXIDE, AND METHOD FOR ITS PRODUCTION AND ITS APPLICATION

(75) Inventors: Kazumasa Suetsugu, Yamaguchi (JP); Kenichi Takahashi, Kanagawa (JP); Akinori Eshita, Miyazaki (JP)

(73) Assignee: TOSOH CORPORATION, Yamaguchi (JP)

( * ) Notice: Subject to any disclaimer, the term of this patent is extended or adjusted under 35 U.S.C. 154(b) by 293 days.

(21) Appl. No.: 13/390,406

(22) PCT Filed: Aug. 23, 2010

(86) PCT No.: PCT/JP2010/064202
§ 371 (c)(1),
(2), (4) Date: Feb. 14, 2012

(87) PCT Pub. No.: WO2011/024765
PCT Pub. Date: Mar. 3, 2011

(65) Prior Publication Data
US 2012/0141361 A1 Jun. 7, 2012

(30) Foreign Application Priority Data

Aug. 24, 2009 (JP) .................................. 2009-193160
Dec. 8, 2009 (JP) .................................. 2009-278237

(51) Int. Cl.
*H01M 4/50* (2010.01)
*C25B 1/21* (2006.01)
(Continued)

(52) U.S. Cl.
CPC . *C25B 1/21* (2013.01); *C01G 45/02* (2013.01); *H01M 4/50* (2013.01); *H01M 4/52* (2013.01);
(Continued)

(58) Field of Classification Search
CPC ..................................................... H01M 4/50
USPC ..................... 429/223, 224; 205/539; 423/605
See application file for complete search history.

(56) References Cited

U.S. PATENT DOCUMENTS 5,938,910 A * 8/1999 Takehara et al. ............... 205/51
6,475,672 B1 11/2002 Iwata et al.
(Continued)

FOREIGN PATENT DOCUMENTS

JP 2000-36304 2/2000
JP 2001-026425 1/2001
(Continued)

OTHER PUBLICATIONS

Journal of Applied Electrochemistry 33: 717-723, 2003.*
(Continued)

*Primary Examiner* — Patrick Ryan
*Assistant Examiner* — Alex Usyatinsky
(74) *Attorney, Agent, or Firm* — Greenblum & Bernstein, P.L.C.

(57) ABSTRACT

An object of the present invention is to provide electrolytic manganese dioxide to be used as a cathode active material for an alkali-manganese dry cell, which has a high alkali potential and is provided with a high reactivity and packing efficiency as a cathode for the cell, and which is excellent in the middle rate discharge characteristic, and electrolytic manganese dioxide excellent in the high rate discharge characteristic and the middle rate discharge characteristic, which will not cause corrosion of metal materials, and a method for its production.

In the present invention, electrolytic manganese dioxide having an alkali potential of at least 280 mV and less than 310 mV, and FWHM of at least 2.2° and at most 2.9°, is used. It is preferred that of the electrolytic manganese dioxide, the (110)/(021) peak intensity ratio in the X-ray diffraction peaks is at least 0.50 and at most 0.80, and the (110) interplanar spacing is at least 4.00 Å and at most 4.06 Å. Further, electrolytic manganese dioxide wherein the JIS-pH (JIS K1467) is at least 1.5 and less than 2.6, the sodium content is at least 0.02 wt % and less than 0.10 wt %, the sulfate group content is less than 1.30 wt %, the median diameter is at least 30 μm and at most 50 μm, and the BET specific surface area is at least 20 m²/g and at most 50 m²/g, is preferred.

11 Claims, 1 Drawing Sheet

(51) Int. Cl.
*H01M 4/52* (2010.01)
*C01G 45/02* (2006.01)
*H01M 6/06* (2006.01)

(52) U.S. Cl.
CPC ............ *H01M 6/06* (2013.01); *C01P 2004/61* (2013.01); *C01P 2006/12* (2013.01); *C01P 2006/80* (2013.01); *Y10T 428/2982* (2015.01)

(56) References Cited

U.S. PATENT DOCUMENTS

| | | | |
|---|---|---|---|
| 6,527,941 | B2 | 3/2003 | Andersen et al. |
| 8,734,992 | B2 * | 5/2014 | Suetsugu et al. .............. 429/224 |
| 2001/0031239 | A1 * | 10/2001 | Andersen et al. ............. 423/605 |
| 2002/0046955 | A1 | 4/2002 | Takahashi et al. |
| 2005/0019658 | A1 * | 1/2005 | Noya et al. .................... 429/223 |
| 2007/0287067 | A1 * | 12/2007 | Takahashi et al. ............. 429/224 |
| 2008/0193847 | A1 * | 8/2008 | Suetsugu et al. .............. 429/224 |
| 2009/0197169 | A1 * | 8/2009 | Nunome et al. ............... 429/207 |

FOREIGN PATENT DOCUMENTS

| | | |
|---|---|---|
| JP | 2001-163622 | 6/2001 |
| JP | 2001-236957 | 8/2001 |
| JP | 2002-304990 | 10/2002 |
| JP | 2002-348693 | 12/2002 |
| JP | 2003-234107 | 8/2003 |
| JP | 2004-47445 | 2/2004 |
| JP | 2007-141643 | 6/2007 |
| JP | 2008-13427 | 1/2008 |
| JP | 2009-117246 | 5/2009 |
| JP | 2009-135067 | 6/2009 |

OTHER PUBLICATIONS

"Titanium Electrode for Manufacture of Electrolytic MnO, Furukawa Denko Report, No. 43", , May 1967, pp. 91-102.

Search report from International Patent Application No. PCT/JP2010/064202, mail date is Sep. 21, 2010.

Japanese Office Action for Japanese Patent App. No. JP 2010-237431, mailed Feb. 18, 2014, along with an English language translation.

Office Action issued Jan. 6, 2014 in CN 201080037738.5 and English language translation thereof.

* cited by examiner

ELECTROLYTIC MANGANESE DIOXIDE, AND METHOD FOR ITS PRODUCTION AND ITS APPLICATION

TECHNICAL FIELD

The present invention relates to electrolytic manganese dioxide to be used as a cathode active material in e.g. manganese dry cells, particularly alkali-manganese dry cells, and a method for its production and its application.

BACKGROUND ART

Manganese dioxide is known as a cathode active material for e.g. manganese dry cells or alkali-manganese dry cells and has advantages such that it is excellent in storage stability and inexpensive. In particular, the alkali-manganese dry cells employing manganese dioxide as a cathode active material, are excellent in the discharge characteristics under heavy loading. Thus, they are widely used in applications ranging from digital cameras, portable tape recorders and portable information apparatus to game machines and toys, and there is a rapidly growing demand for them.

However, alkali-manganese dry cells have had a problem such that the utilization rate of manganese dioxide as a cathode active material decreases with the increase of the discharge current and manganese dioxide cannot use in such low discharge voltage condition, whereby the discharge capacity will be substantially impaired. That is, the alkali-manganese dry cells have had a drawback that when they are used in apparatus using a large current (for high rate discharge), manganese dioxide packed as a cathode active material is not sufficiently utilized, and the useful time is short.

Therefore, excellent manganese dioxide capable of providing a high capacity and long useful life even under such a high rate pulse discharge condition that a large current is taken out in a short period of time, i.e. manganese dioxide excellent in a so-called high rate discharge characteristic, has been desired.

Heretofore, in order to improve the high rate discharge characteristic, production of electrolytic manganese dioxide having a high potential (hereinafter referred to as alkali potential) as measured in a 40 wt % KOH aqueous solution by using a mercury/mercury oxide reference electrode as a standard, has been proposed (Patent Documents 1 to 3 and Non-Patent Document 1).

Further, along with energy saving of digital apparatus in recent years, the characteristics under discharge current (for middle rate discharge) lower than the high rate discharge are required, and electrolytic manganese dioxide excellent not only in the high rate discharge characteristic but also in the middle rate discharge characteristic has been desired.

As a method for producing electrolytic manganese dioxide having improved high rate discharge characteristic, a method for producing electrolytic manganese dioxide by heating electrolytic manganese dioxide before neutralization to reduce the amount of use of sodium has been proposed (Patent Document 4). However, as the crystal structure of the electrolytic manganese dioxide is changed by heating, the high rate discharge characteristic of the electrolytic manganese dioxide to be obtained is insufficient. Further, by this production method, neutralization of the electrolytic manganese dioxide is insufficient since the amount of use of sodium is reduced, and such may cause corrosion of metal materials in the interior of the dry cell.

Further, the high rate discharge characteristic is improved by controlling the sulfuric acid amount, and a method for producing electrolytic manganese dioxide by controlling the surface sulfuric acid amount to be at least 0.10 wt % (Patent Document 5) and a method for producing manganese dioxide by adjusting the sulfate group content to be from 1.3 wt % to 1.6 wt % (Patent Document 6) have been proposed. However, since the electrolytic manganese dioxide obtained by such a production method contains a large amount of sulfuric acid, not only deterioration of the dry cell during storage results or the cell voltage tends to be unstable, but also corrosion of metal materials in the production apparatus or the interior of the dry cell may occur.

On the other hand, in order to improve the high rate discharge characteristic without a problem of the corrosion of the metal materials, a production method of controlling the MS-pH and the sulfate group content of the electrolytic manganese dioxide and further controlling the particle size of the electrolytic manganese dioxide and the sodium content has been proposed (Patent Document 7). However, although the electrolytic manganese dioxide obtainable by this production method is less likely to cause corrosion of the metal materials and is excellent in the high rate discharge characteristic, its middle rate discharge characteristic is still insufficient.

Further, electrolytic manganese dioxide excellent in the high rate discharge characteristic obtained by an electrolysis method by changing the sulfuric acid concentration during the electrolysis period (Patent Document 3) and electrolytic manganese dioxide excellent in the high rate discharge characteristic obtained by treating the electrolytic manganese dioxide after electrolysis with sulfuric acid (Patent Document 8) have been proposed, however, their middle rate discharge characteristic is still insufficient.

As described above, heretofore, electrolytic manganese dioxide excellent in both high rate discharge characteristic and middle rate discharge characteristic, which does not cause corrosion of the metal materials, has not been obtained yet.

PRIOR ART DOCUMENT

Patent Document

Patent Document 1: JP-A-2007-141643
Patent Document 2: U.S. Pat. No. 6,527,941
Patent Document 3: JP-A-2009-135067
Patent Document 4: JP-A-2001-026425
Patent Document 5: JP-A-2002-304990
Patent Document 6: JP-A-2004-047445
Patent Document 7: JP-A-2008-013427
Patent Document 8: JP-A-2009-117246

Non-Patent Document

Non-patent Document 1: Furukawa Denko Report, No. 43, p. 91-102 (May, 1967)

DISCLOSURE OF INVENTION

Technical Problem

It is an object of the present invention to provide electrolytic manganese dioxide which is manganese dioxide to be used as a cathode active material for an alkali-manganese dry cell excellent particularly in the high rate discharge characteristic and which has a properly high potential particularly in an alkaline electrolyte and is provided with a high reactivity and packing efficiency, and a method for its production and its application. Further, it is another object of the present invention to provide electrolytic manganese dioxide excellent in both the cell characteristics of high rate discharge characteristic and middle rate discharge characteristic, and which will not cause corrosion of metal materials, and a method for its production.

Solution to Problem

As a result of an extensive study on manganese dioxide to be used as a cathode active material particularly for alkali-manganese dry cells, the present inventors have found that electrolytic manganese dioxide having an alkali potential of at least 280 mV and less than 310 mV, and a full width at half maximum (hereinafter referred to as FWHM) of the (110) diffraction line appearing in the vicinity of $2\theta=22\pm1°$ in XRD (X-ray diffraction) measurement using CuKα radiation as the light source being at least 2.2° and at most 2.9°, becomes a cathode material excellent particularly in the middle rate discharge characteristic, and the present invention has been accomplished on the basis of this discovery.

That is, the present invention provides the following (1) to (12).

(1) Electrolytic manganese dioxide characterized in that the potential as measured in a 40 wt % KOH aqueous solution by using a mercury/mercury oxide reference electrode as a standard, is at least 280 mV and less than 310 mV, the full width at half maximum (FWHM) of the (110) plane in the XRD measurement using CuKα radiation as the light source is at least 2.2° and at most 2.9°, and the (110)/(021) peak intensity ratio in the X-ray diffraction peaks is at least 0.50 and at most 0.80.

(2) Preferably, the electrolytic manganese dioxide according to the above (1), wherein the (110) interplanar spacing in the X-ray diffraction peaks is at least 4.00 Å and at most 4.06 Å.

(3) Preferably, the electrolytic manganese dioxide according to the above (1), wherein the JIS-pH (JIS K1467) is at least 1.5 and less than 2.6, and the sodium content is at least 0.02 wt % and less than 0.10 wt %.

(4) Preferably, the electrolytic manganese dioxide according to the above (1), wherein the sulfate group content is less than 1.30 wt %.

(5) Preferably, the electrolytic manganese dioxide according to the above (1), wherein the median diameter is at least 30 μm and at most 50 μm.

(6) Preferably, the electrolytic manganese dioxide according to the above (1), wherein the BET specific surface area is at least 20 m$^2$/g and at most 50 m$^2$/g.

(7) A method for producing electrolytic manganese dioxide by electrolysis in an aqueous solution of sulfuric acid/manganese sulfate mixture, characterized in that the concentration of sulfuric acid in the electrolyte at the termination of the electrolysis is higher than the concentration of sulfuric acid in the electrolyte at the initiation of the electrolysis and that the concentration of sulfuric acid at the initiation of the electrolysis is at least 20 g/L and at most 35 g/L, and the concentration of sulfuric acid at the termination of the electrolysis is higher than 35 g/L and at most 40 g/L.

(8) Preferably, the method for producing electrolytic manganese dioxide according to the above (7), characterized in that the obtained electrolytic manganese dioxide is ground to obtain a slurry, and the slurry is neutralized to a pH of at least 2.0 and at most 5.0, then washed and dried.

(9) Preferably, the method for producing electrolytic manganese dioxide according to the above (8), wherein the washing is carried out until the alkali metal content in the electrolytic manganese dioxide becomes at least 0.02 wt % and less than 0.10 wt %.

(10) Preferably, the method for producing electrolytic manganese dioxide according to the above (8), wherein the washing is carried out until the sulfate group content in the electrolytic manganese dioxide becomes less than 1.30 wt %.

(11) A cathode active material for an electric cell containing the electrolytic manganese dioxide as defined in the above (1).

(12) An electric cell containing the cathode active material for an electric cell as defined in the above (11).

Advantageous Effects of Invention

The dielectric manganese dioxide of the present invention is, when used as a cathode material for an alkaline cell, excellent in the middle rate discharge characteristic, and is further excellent in both the cell characteristics of high rate discharge characteristic and middle rate discharge characteristic, causes little corrosion of metal materials, and is useful as a cathode active material for an electric cell.

DESCRIPTION OF EMBODIMENTS

Now, the present invention will be described in detail below.

The electrolytic manganese dioxide of the present invention is manganese dioxide, of which the alkali potential is at least 280 mV and less than 310 mV, and the full width at half maximum (FWHM) of the (110) diffraction line in the vicinity of $2\theta=22\pm1°$ is at least 2.2° and at most 2.9°.

When the alkali potential is at least 280 mV and less than 310 mV, in a case where such a material is used as a cathode material for an alkali-manganese dry cell, the open circuit voltage of the cell will be increased, and it is possible to prolong the discharge time until the lower limit of the useful discharge voltage. The alkali potential is preferably at least 285 mV and less than 310 mV, further preferably at least 290 mV and less than 310 mV.

The relation between the alkali potential and the middle rate discharge characteristic is not clearly understood, but for the improvement of the middle rate discharged characteristic, the alkali potential is required to be high to a certain extent. On the other hand, if the alkali potential exceeds a certain value, the middle rate discharge characteristic is decreased again, although the reason is not clearly understood. Further, at the same alkali potential, the middle rate discharge characteristic varies depending upon the physical properties.

Of the electrolytic manganese dioxide of the present invention, the full width at half maximum (FWHM) of the (110) diffraction line in the vicinity of $2\theta=22\pm1°$ in the pattern obtained by usual XRD measurement using CuKα radiation as the light source, is at least 2.2° and at most 2.9°, preferably at least 2.4° and at most 2.8°, further preferably at least 2.5° and at most 2.8°. With such FWHM, the packing efficiency of the electrolytic manganese dioxide will be improved, and the discharge capacity will be increased.

On the other hand, with one having a FWHM larger than 2.9°, when a cell is constructed by using it as a cathode material, the packing density tends to be low, and the discharge capacity tends to be low accordingly. With one having a FWHM smaller than 2.2°, crystallite growth tends to be too much, whereby the reactivity of electrolytic manganese dioxide tends to be poor, and the discharge capacity as a cathode active material for a cell tends to decrease.

The reason for the lower limit of FWHM being as small as 2.2° is such that the electrolytic manganese dioxide of the present invention is obtained, for example, by the after-mentioned electrolysis in an electrolyte containing sulfuric acid at a low concentration and the subsequent electrolysis using an electrolyte containing sulfuric acid at a high concentration, and accordingly, in a case where the ratio of the time for electrolysis in the electrolyte containing sulfuric acid at a low concentration is high, it will be manganese dioxide having a small FWHM and being excellent in the middle rate discharge characteristic.

The crystallite diameter of the electrolytic manganese dioxide of the present invention is obtained by the Scherrer's formula from FWHM and the (110) peak position, and the average crystallite diameter corresponds to at least 29 Å and at most 37 Å. With electrolytic manganese dioxide having an average crystallite diameter larger than 37 Å, the reactivity tends to decrease, and the discharge capacity tends to be low, as mentioned above, and with one having an average crystallite diameter smaller than 29 Å, the packing efficiency tends to be poor, and the volume energy density tends to be low.

The electrolytic manganese dioxide of the present invention is such that the (110)/(021) peak intensity ratio in the X-ray diffraction is preferably at least 0.50 and at most 0.80, more preferably at least 0.53 and at most 0.80, further preferably at least 0.6 and at most 0.75.

The intensity ratios of the respective diffraction planes in the X-ray diffraction pattern of the electrolytic manganese dioxide vary depending upon the conditions for the electrolysis, and consequently, vary depending upon the physical properties of manganese dioxide obtained. With manganese dioxide obtained by electrolyzing only in the electrolyte having a high sulfuric acid concentration, the (110)/(021) peak intensity ratio becomes less than 0.50. On the other hand, with a product having a high alkali potential obtained by electrolysis at a low current density, such a peak intensity ratio exceeds 0.8, such being different from the manganese dioxide of the present invention.

The (110) plane in the X-ray diffraction of the electrolytic manganese dioxide appears in the vicinity of 22±1° as mentioned above, and the (021) plane appears in the vicinity of 37±1°, and they correspond to the main X-ray diffraction peak of the manganese dioxide crystal.

The electrolytic manganese dioxide of the present invention is preferably such that the (110) interplanar spacing in the X-ray diffraction is preferably at least 4.00 Å and at most 4.06 Å with satisfying the above-described characteristics.

Here, the (110) interplanar spacing is an index to represent a distance between (110) crystal planes of manganese dioxide belonging to orthorhombic crystal.

The electrolytic manganese dioxide of the present invention has characteristics in e.g. the alkali potential, the FWHM of the (110) plane, the (110) interplanar spacing, and the (110)/(021) peak intensity ratio and thus is different and can readily be distinguished from one having only the alkali potential or the packing efficiency adjusted by mixing conventional electrolytic manganese dioxides obtained under different conditions.

The pore volume of the electrolytic manganese dioxide of the present invention is not greatly different from that of conventional electrolytic manganese dioxide, and for example, the 3 to 5 nm pore volume is at least 0.012 cm$^3$/g, more preferably at least 0.013 cm$^3$/g. Since there is no substantial difference in the pore structure, the same packing efficiency as that of the conventional electrolytic manganese dioxide can be obtained, and there is no decrease in the volume energy density.

In the case of the electrolytic manganese dioxide of the present invention particularly excellent in the high rate discharge characteristic and the middle rate discharge characteristic, the JIS-pH based on JIS K1467 (hereinafter referred to simply as "JIS-pH") of the electrolytic manganese dioxide is at least 1.5 and less than 2.6, more preferably at least 1.8 and at most 2.4. If the JIS-pH is at least 2.6, the cell discharge characteristics tend to be insufficient, and particularly if the JIS-pH is at least 2.6 and less than 3.5, the high rate discharge characteristic is relatively high, but the middle rate discharge characteristic is only at the same level as the conventional manganese dioxide. If the JIS-pH is less than 1.5, corrosion of the metal materials in a processing plant, a cell can or the like tends to occur.

The electrolytic manganese dioxide of the present invention particularly excellent in the high rate discharge characteristic and the middle rate discharge characteristic has an alkali metal content of preferably at least 0.02 wt % and less than 0.10 wt %, more preferably at least 0.02 wt % and at most 0.09 wt %, further preferably at least 0.03 wt % and at most 0.08 wt %.

Alkali metals contained in the electrolytic manganese dioxide derive mainly from the neutralizing agent, and accordingly the most of them are present as adsorbed on the particle surface. Accordingly, if the alkali metal content is at least 0.10 wt %, the cell discharge reaction accompanied by the proton diffusion from the particle surface to the interior tends to be impaired, whereby the discharge characteristics are likely to deteriorate. On the other hand, if the alkali metal content is less than 0.02 wt %, corrosion of the metal materials is very likely to occur. Sodium hydroxide is used as an industrial neutralizing agent, and sodium may be mentioned as a main alkali metal contained in the manganese dioxide.

The reason why the electrolytic manganese dioxide of the present invention has excellent cell performance is considered to be because the alkali metals and the sulfate groups present at a moiety which particularly impairs the cell performance are removed. However, even the electrolytic manganese dioxide washed after the neutralization treatment does not exhibit the cell characteristics of the present invention in some cases depending upon the electrolysis conditions. The electrolytic manganese dioxide of the present invention is particularly preferably one having physical properties characteristic to electrolytic manganese dioxide obtainable by carrying out electrolysis in a sulfuric acid/manganese sulfate bath wherein the concentration of sulfuric acid in the electrolyte at the termination of the electrolysis is higher than the concentration of sulfuric acid in the electrolyte at the initiation of the electrolysis.

The electrolytic manganese dioxide of the present invention particularly excellent in the high rate discharge characteristic and the middle rate discharge characteristic has a sulfate group content of preferably less than 1.30 wt %, more preferably at most 1.25 wt %. If the sulfate group content is at least 1.30 wt %, deterioration of the dry cell during storage tends to result or the cell voltage tends to be unstable, and corrosion of the metal materials of the apparatus for production of the cathode material, the can material in the interior of the dry cell and the like is likely to occur.

The sulfate groups contained in the electrolytic manganese dioxide derive mainly from sulfate ions in the electrolyte brought into the interior of the electrolytic manganese dioxide particles electrodeposited, and usually the electrolytic manganese dioxide after electrodeposition contains from 2 wt % to 3 wt % of sulfate groups. As the sulfate groups, ones which can be desorbed by washing with water or by neutralization operation (hereinafter referred to as "surface sulfuric acid") and ones which cannot be desorbed from the electrolytic manganese dioxide even by sufficient washing with water or by neutralization operation (hereinafter referred to as "internal sulfuric acid") are known. The amount of the internal sulfuric acid in the electrolytic manganese dioxide varies depending upon the electrolysis conditions, but at least it is at least 0.90 wt % and at most 1.25 wt %.

From the electrolytic manganese dioxide of the present invention particularly excellent in the high rate discharge characteristic and the middle rate discharge characteristic, the surface sulfuric acid can be highly removed by neutralization before washing. The sulfate groups contained in the electrolytic manganese dioxide as a whole is preferably less than 1.30 wt %.

The electrolytic manganese dioxide of the present invention particularly excellent in the high rate discharge characteristic and the middle rate discharge characteristic has a median diameter of preferably at least 30 μm and at most 50 μm, more preferably at least 35 μm and at most 45 μm. If the median diameter exceeds 50 μm, the reaction surface area of the powder tends to be decreased, whereby the cell reactivity tends to be decreased, and in the case of an electrolytic manganese dioxide powder having a median diameter of less than 30 μm, the packing efficiency will be decreased, and the volume energy density of the cell tends to be decreased.

The maximum particle size of the electrolytic manganese dioxide of the present invention particularly excellent in the high rate discharge characteristic and the middle rate discharge characteristic is not particularly limited, but is preferably at most 250 μm, more preferably at most 200 μm. If a powder of the dielectric manganese dioxide in a size with the maximum particle size exceeding 250 μm is present, the interior of the cell can will be damaged and as a result, metal plating applied to the cell can will be impaired, and it will react with the exposed iron to cause gas formation. Further, the separator which insulates the anode from the cathode in the cell tends to be impaired, whereby self-discharge tends to occur during storage of the cell, thus leading to a decrease in the capacity.

In the electrolytic manganese dioxide of the present invention particularly excellent in the high rate discharge characteristic and the middle rate discharge characteristic, the proportion of number of particles having particle sizes of at most 1 μm is preferably at least 3% and at most 25%. If the proportion of the number of particles having particle sizes of at most 1 μm contained in the electrolytic manganese dioxide is less than 3%, a powder formed product formed by pressurizing the electrolytic manganese dioxide tends to be fragile and to be broken, and if it exceeds 25%, the contact with an electrolytically conductive material tends to be insufficient, and the amount of the electrolytic manganese dioxide which can effectively be utilized tends to be small.

The electrolytic manganese dioxide of the present invention particularly excellent in the high rate discharge characteristic and the middle rate discharge characteristic has a corrosion rate to the metal materials of preferably at most 0.01 mm/year. If the corrosion rate exceeds 0.01 mm/year, corrosion of the metal portion in an apparatus for production of a cathode material and the metal materials of e.g. the can material in the interior of the dry cell is likely to occur.

In the electrolytic manganese dioxide of the present invention, the BET specific surface area is preferably at least 20 $m^2/g$ and at most 50 $m^2/g$, more preferably at least 20 $m^2/g$ and at most 40 $m^2/g$, further preferably at least 22 $m^2/g$ and at most 32 $m^2/g$. If the BET specific surface area is smaller than 20 $m^2/g$, the reaction area of the electrolytic manganese dioxide tends to be reduced, whereby the discharge capacity will be decreased. On the other hand, if the BET specific surface area is larger than 50 $m^2/g$, the packing efficiency of the electrolytic manganese dioxide tends to be decreased, and the discharge capacity when a cell is constituted is likely to be decreased.

Now, the method for producing electrolytic manganese dioxide of the present invention will be described.

A conventional method for producing electrolytic manganese dioxide is carried out so that the sulfuric acid concentration in the electrolyte be maintained to be constant during the electrolysis, and thus the production is carried out with substantially no change in the sulfuric acid concentration in the electrolyte during the electrolysis. Whereas the method of the present invention is a method of electrolysis wherein the sulfuric acid concentration is changed as between at the time of initiation and at the time of termination of the electrolysis, and electrolytic manganese dioxide particularly excellent in the middle rate discharge characteristic can be obtained within a specific range of the concentration.

Further, in conventional production of manganese dioxide for an alkali-manganese cell by the electrolysis method, electrolytic manganese dioxide deposited by electrolysis using an electrolyte having a constant sulfuric acid concentration over the entire electrolysis period is separated from the electrode and ground, and then washed with water to remove the sulfate groups, and then neutralized with an alkali to neutralize the acidity on the surface and the remaining surface sulfuric acid, and then dried.

Of the electrolytic manganese dioxide obtained by such a method, the potential is low, and alkali metal ions adsorbed on the surface of the electrolytic manganese dioxide by neutralization after washing with water inhibit the cell reaction. Accordingly, of the obtained electrolytic manganese dioxide, the cell characteristics are low, and in order to improve the cell characteristics, additional treatment such as washing with an acid or heat treatment is required. Further, with respect to washing with water, repeated operation of washing with water is required to remove the sulfate groups to a level not to be influential over the storage stability and the cell voltage, and such is extremely inefficient.

Further, by the electrolysis method wherein the sulfuric acid concentration in the electrolyte is changed during the electrolysis period, although manganese dioxide with improved high rate discharge characteristic is obtained, but manganese dioxide with both high rate discharge characteristic and middle rate discharge characteristic being high is not obtained.

In the method of the present invention, electrolytic manganese dioxide electrodeposited in a sulfuric acid/manganese sulfate bath wherein the sulfuric acid concentration is controlled to be different values during the electrolysis period, is neutralized to a specific pH before washing, whereby electrolytic manganese dioxide excellent in both high rate discharge characteristic and middle rate discharge characteristic can be obtained.

Now, the method of the present invention will be described in detail below.

In the production of manganese dioxide by electrolysis, if the sulfuric acid concentration in the electrolyte is set to be low, electrolytic manganese dioxide will be electrodeposited firmly on the anode, whereby there is no problem of peeling, but it is thereby possible to obtain only electrolytic manganese dioxide having a low alkali potential.

On the other hand, under electrolysis conditions where the sulfuric acid concentration is high from the initiation, manganese dioxide having a high alkali potential may be obtained, but peeling occurs during electrodeposition, and it is not possible to constantly obtain manganese dioxide having a high potential, and the crystallite diameter tends to be small, and it is possible to obtain only a product having a large BET surface area and low packing efficiency.

The present invention is that in the initial stage, it is possible to obtain manganese dioxide having a large crystallite diameter, a small BET surface area and high packing efficiency by the electrolysis at a sulfuric acid concentration of at least 20 g/L and at most 35 g/L, and further by the subsequent electrolysis at a sulfuric acid concentration exceeding 35 g/L and at most 40 g/L, electrolytic manganese dioxide excellent in the middle rate discharge characteristic will be obtained. Further, it is preferred that the sulfuric acid concentration in the electrolyte at the initiation of the electrolysis is at least 25 g/L and at most 35 g/L, the sulfuric acid concentration is increased in the latter stage, and it is at least 37 g/L and at most 40 g/L at the termination of the electrolysis.

Here, the sulfuric acid concentration excludes bivalent anions of manganese sulfate.

The manganese concentration in the electrolyte feed solution of the present invention is not particularly limited, and it may, for example, be at least 35 g/L and at most 60 g/L.

The temperature for the electrolysis is not particularly limited, and it may, for example, be a temperature within a range of at least 94° C. and at most 98° C. Further, the current density may, for example, be at least 0.4 A/dm$^2$ and at most 0.6 A/dm$^2$.

In the present invention, it is preferred that the sulfuric acid concentration is changed between the electrolysis in the initial stage and the electrolysis in the latter stage, not that the sulfuric acid concentration in the electrolyte is gradually changed from the initiation of the electrolysis to the termination of the electrolysis.

The ratio of the electrolysis in the initial stage to the electrolysis in the latter stage is not particularly limited, but the ratio in the electrolysis time at the lower sulfuric acid concentration to at the high sulfuric acid concentration may, for example, be preferably within a range of from 1:9 to 9:1, particularly preferably from 3:7 to 7:3.

The electrode material at the time of the electrolysis is not particularly limited, and may, for example, be a metal such as a titanium material or a graphite material.

In the method for producing electrolytic manganese dioxide of the present invention, particularly when electrolytic manganese dioxide having high rate discharge characteristic and middle rate discharge characteristic being high is to be obtained, electrolytic manganese dioxide electrodeposited by the above electrolysis method is preferably neutralized after grinding before washing.

The reason why the electrolytic manganese dioxide produced by the method of carrying out electrolysis by the above electrolysis method, followed by neutralization and then washing is excellent in the high rate discharge characteristic and the middle rate discharge characteristic is not clearly understood, but the following mechanism is considered.

In the conventional method for producing electrolytic manganese dioxide, neutralization is carried out after washing with water, and accordingly at the time of washing with water, sulfate groups are first removed as $H_2SO_4$, and alkali metals in the neutralizing agent to be used for neutralization after the washing remain on the surface of the electrolytic manganese dioxide. Such alkali metals are considered to inhibit the proton shift in the cell reaction, thus lowering the cell activity.

Whereas, in the method for producing electrolytic manganese dioxide of the present invention, since neutralization is carried out before washing, alkali metals and sulfate groups are converted to an alkali metal sulfate first, and accordingly the sulfate groups and the alkali metals are in a readily removable stage, and by washing with water after the neutralization, alkali metal ions and the sulfate groups are both removed by washing. Therefore, the alkali metals present at a moiety which particularly impairs the cell performance are removed as the alkali metal sulfate, whereby electrolytic manganese dioxide provided with a high discharge reactivity will be obtained.

In this case, in the method for producing electrolytic manganese dioxide of the present invention, it is considered that alkali metals present at a moiety which particularly inhibits the cell performance are highly removed as an alkali metal sulfate, by using electrolytic manganese dioxide obtained by the electrolysis in a sulfuric acid/manganese sulfate bath wherein the sulfuric acid concentration in the electrolyte at the termination of the electrolysis is higher than the sulfuric acid concentration in the electrolyte at the initiation of the electrolysis, that is, electrolytic manganese dioxide having particularly high packing efficiency and potential.

The neutralization in the present invention is carried out by dispersing the ground electrolytic manganese dioxide in water to obtain a slurry and neutralizing the slurry, and the pH of the slurry is at least 2.0 and at most 5.0, preferably at least 2.2 and at most 4.8, more preferably at least 2.6 and at most 4.8, further preferably at least 2.8 and at most 4.5. By the neutralization so that the pH of the slurry is within such a range, alkali metals remaining in electrolytic manganese dioxide to be finally obtained can be extremely reduced, whereby electrolytic manganese dioxide excellent in the high rate discharge characteristic and the middle rate discharge characteristic, which will not cause corrosion of metal materials, can be obtained.

When the pH of the slurry is lower than 2.0, the electrolytic manganese dioxide will not sufficiently be neutralized, and the obtained electrolytic manganese dioxide will cause corrosion of metal materials in an apparatus for processing and producing a cell cathode material. On the other hand, if the pH of the slurry is higher than 5.0, a phenomenon (deflocculation) such that fine particles of electrolytic manganese dioxide are dispersed and not settled will occur, and a washing effect will hardly be obtained.

Here, the pH of the slurry is a pH obtained by directly measuring the water in the slurry when the electrolytic manganese dioxide is dispersed in water, and is different from the JIS-pH (JIS K1467) measured after adding ammonium chloride to the slurry. The pH of the slurry can be measured by using a common pH standard electrode.

In the method for producing electrolytic manganese dioxide of the present invention, the method of grinding electrolytic manganese dioxide is not particularly limited so long as a predetermined particle size, for example, the median diameter, can be adjusted so as to be at least 30 μm and at most 50 μm, preferably at least 35 μm and at most 45 μm, and for example, grinding by a jet mill or a ball mill may be mentioned.

In the method for producing electrolytic manganese dioxide of the present invention, for neutralization of electrolytic manganese dioxide, an alkali solution can be used. As the alkali solution, an aqueous solution of an alkali metal hydroxide such as sodium hydroxide, potassium hydroxide or lithium hydroxide, or an ammonia water may, for example, be used, and it is particularly preferred to use an aqueous solution of sodium hydroxide which is industrially inexpensive.

The concentration of the alkali solution to be used for neutralization varies depending upon the alkali solution used, and for example, in a case where the alkali solution is an aqueous solution of sodium hydroxide, it is from 1 to 48 wt %, preferably from 5 to 20 wt %.

Further, when the electrolytic manganese dioxide slurry is neutralized, addition of the alkali solution is preferably carried out so that the pH of the electrolytic manganese dioxide slurry is to be a desired value, and for example, the alkali solution can be added so that the pH of the electrolytic manganese dioxide slurry becomes at least 1.5 and less than 2.6. Accordingly, the amount of the alkali solution to be added can properly be adjusted in accordance with the type and the concentration of the alkali solution to be used, the concentration and the amount of use of the electrolytic manganese dioxide slurry, etc.

In the method for producing electrolytic manganese dioxide of the present invention, the method of neutralization is not particularly limited, and either of batch neutralization and continuous neutralization may be employed. Further, the concentration of the electrolytic manganese dioxide slurry at the time of neutralization is also not particularly limited, however, from the viewpoint of efficiency of the neutralization, the concentration of electrolytic manganese dioxide is preferably within a range of at least 150 g/L and at most 450 g/L, particularly preferably at least 150 g/L and at most 300 g/L.

In the method for producing electrolytic manganese dioxide of the present invention, the method of washing with water is not particularly limited, and either of batch washing and continuous washing may be employed. The slurry concentration at the time of washing with water is also not particularly limited, but is preferably at least 200 g/L and at most 900 g/L. If the slurry concentration is less than 200 g/L or higher than 900 g/L, the efficiency of washing with water tends to be decreased.

In the method for producing electrolytic manganese dioxide of the present invention, the alkali metal content in electrolytic manganese dioxide is made by the above-described neutralization and washing to be preferably at least 0.02 wt % and less than 0.10 wt %, more preferably at least 0.02 wt % and at most 0.05 wt %.

Further, the sulfate group content in electrolytic manganese dioxide is made by the above-described neutralization and washing to be preferably less than 1.30 wt %.

In the method for producing electrolytic manganese dioxide of the present invention, the electrolytic manganese dioxide powder after washing with water is used as dried. As the drying conditions, drying under usual conditions, for example, at a temperature of at most 200° C., particularly preferably at from 80° C. to 150° C., is conducted. By treatment at a temperature higher than 200° C., hydroxy groups on the surface of electrolytic manganese dioxide will be desorbed, whereby hydrophilicity on the electrolytic manganese dioxide surface and the property of maintaining liquid in the powder particles tend to be decreased, and corrosion of metal materials is likely to occur. Particularly by drying at 250° C. or higher, the crystal phase will be changed from the γ-form to the β-form, and the cell activity as a cathode material for an alkaline dry cell tends to be decreased.

Electrolytic manganese dioxide of the present invention has excellent performance as a cathode material for an electric cell particularly an alkaline primary cell.

In preparation of an electric cell using electrolytic manganese dioxide of the present invention as a cathode material, other compositions contained in the cell cathode material are not particularly limited, and graphite or acetylene black may, for example, be mentioned as an electrically conductive material, and further, an aqueous potassium hydroxide solution may, for example, be mentioned as an electrolyte.

EXAMPLES

Now, the present invention will be described in further detail with reference to Examples and Comparative Examples, but it should be understood that the present invention is by no means restricted thereto.
(Slurry pH at the Time of Neutralization)

The pH of the slurry was measured with respect to the electrolytic manganese dioxide slurry during the neutralization by using a pH standard electrode.
(JIS-pH of Electrolytic Manganese Dioxide)

The JIS-pH was measured by JIS K1467 (ammonium chloride method). That is, a method was employed wherein a certain amount of manganese dioxide was put in a certain amount of an ammonium chloride buffer solution, and the pH of the supernatant liquid was obtained.
(Sulfate Group and Sodium Contents)

The sulfate group and sodium contents of electrolytic manganese dioxide powder particles were quantitatively determined by measuring a solution having the electrolytic manganese dioxide powder dissolved in hydrochloric acid and hydrogen peroxide solution, by the atomic absorption method.
(Measurement of Potential of Electrolytic Manganese Dioxide)

The potential of electrolytic manganese dioxide was measured in a 40 wt % KOH aqueous solution as follows.

To 3 g of electrolytic manganese dioxide, 0.9 g of carbon was added as an electrically conductive agent to obtain a powder mixture, and 4 ml of a 40 wt % KOH aqueous solution was added to this powder mixture to obtain a mixture slurry comprising the electrolytic manganese dioxide, the carbon and the KOH aqueous solution. The potential of this mixture slurry was measured by using a mercury/mercury oxide reference electrode as a standard to obtain an alkali potential of the electrolytic manganese dioxide.
(Measurement of Full Width at Half Maximum (FWHM) in XRD Measurement)

The full width at half maximum (FWHM) of the diffraction line in the vicinity of $2\theta=22\pm1°$ of electrolytic manganese dioxide was measured by using a usual X-ray diffraction apparatus (MXP-3, manufactured by MAC Science Co., Ltd.). The measurement was carried out by using CuKα radiation ($\lambda=1.5405$ Å) as the radiation source; the measurement mode was step scanning; the scanning condition was 0.04° per second; measuring time was 3 seconds; and the measuring range was within a range of 2θ being from 5° to 80°.
(Calculation of (110) Interplaner Spacing by XRD Measurement)

The diffraction line in the vicinity of $2\theta=22\pm1°$ of electrolytic manganese dioxide was subjected to Gaussian treatment to obtain 2θ at the peak top. From the obtained 2θ value, d was calculated by Bragg's equation ($n\lambda=2d\sin\theta$, $n=1$) and taken as the (110) interplaner spacing.

(Calculation of (110)/(021) Intensity Ratio by XRD Measurement)

Assuming that the diffraction line in the vicinity of 2θ=22±1° represents (110), and the diffraction line in the vicinity of 37±1° represents (021), the (110)/(021) peak intensity ratio (hereinafter referred to as (110)/(021)) was obtained by dividing the (110) peak intensity by the (021) peak intensity.

(Measurement of Bet Specific Surface Area of Electrolytic Manganese Dioxide)

The BET specific surface area of electrolytic manganese dioxide was measured by nitrogen adsorption by BET one point method. Here, electrolytic manganese dioxide used for the measurement of BET specific surface area was subjected to deaeration treatment by heating it at 150° C. for 40 minutes before the measurement of the BET specific surface area.

(Measurement of Pore Volume)

The 3 to 5 nm pore volume of electrolytic manganese dioxide was measured. Electrolytic manganese dioxide was dried at 120° C. for 1 hour, and then the 3 to 5 nm pore volume was measured by BJH method (Barrett Jouner and Halenda method), whereby the pore volume per unit weight was determined.

(Median Diameter)

The particle size and the number of particles of electrolytic manganese dioxide were measured by using a light scattering method (manufactured by NIKKISO CO., LTD., tradename: Microtrac) of measurement by scattered light obtained by irradiating a solution having electrolytic manganese dioxide dispersed and suspended with a laser light, whereby the median diameter was calculated.

(Evaluation of Middle Rate Discharge Characteristic)

Figure 1:
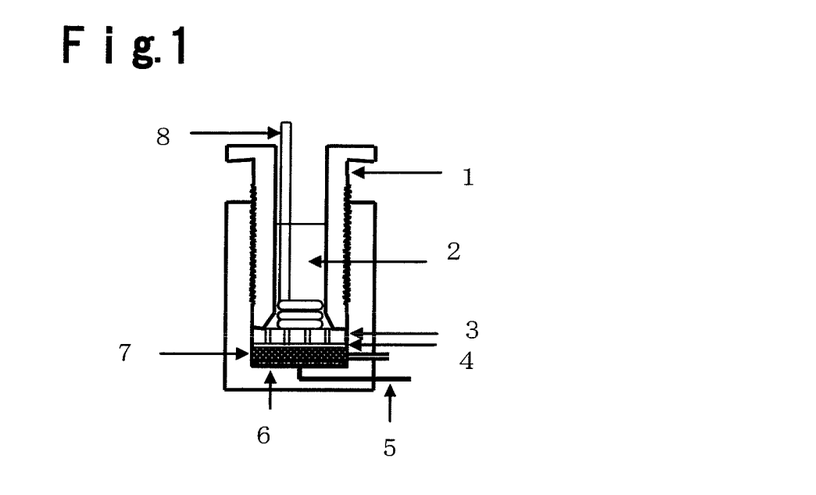
FIG. 1 illustrates a cell for evaluation of the discharge characteristic.

Electrolytic manganese dioxide, an electrically conductive material and a 40 wt % KOH aqueous solution were weighed in amounts of 80 wt %, 5 wt % and 15 wt %, respectively, and mixed to prepare a cathode mixture. The cathode mixture was weighed to be 0.09 g as calculated as manganese dioxide and formed, and a zinc wire was used as an anode, whereby discharge characteristics were evaluated by a cell for evaluation shown in FIG. 1. The cell for evaluation was left at rest at room temperature for one hour, and then the discharge test was carried out. As the discharge conditions, the relative discharge capacity at an electric current of 10 mA/g at a cut-off voltage of 0.9 V was evaluated and taken as the middle rate discharge characteristic. The discharge capacities in Example 1 and Comparative Example 3 were determined as relative values when the result of measurement of the discharge capacity in Comparative Example 1 was taken as 100%. Further, the discharge capacities in Examples 11 to 19 and Comparative Examples 4 to 6 were determined as relative values when the result of measurement of the discharge capacity in Example 20 was taken as 100%.

(Evaluation of High Rate Discharge Characteristic)

5 g of a powder mixture comprising 90.0 wt % of an electrolytic manganese dioxide powder, 6.0 wt % of graphite and 4.0 wt % of a 40 wt % potassium hydroxide electrolyte, was molded into a ring shape under a molding pressure of 2 tons to obtain a molded product. Two such molded products were combined to be a cathode, and using an anode material containing zinc, as an anode, an electric cell of AA battery was assembled. Such an AA battery-type cell was left to stand at room temperature for 24 hours and then subjected to a discharge test. The discharge conditions were such that a cycle of discharging at 1,000 mA for 10 seconds, followed by pausing for 50 seconds was regarded as one pulse, and the number of pulses until the voltage reached a cut-off voltage of 0.9 V was measured and represented as a relative value when the number of pulses when electrolytic manganese dioxide in Example 20 was used was taken as 100.

(Metal Corrosion Test)

Figure 2:
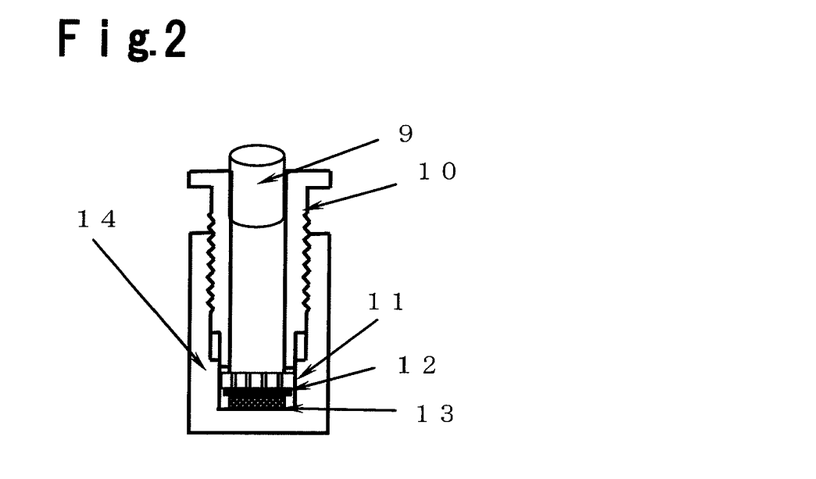
FIG. 2 is a view schematically illustrating a corrosion test container totally made of polyvinyl chloride used in a metal corrosion test.

A powder mixture comprising 10 g of an electrolytic manganese dioxide powder, 0.7 g of graphite and 0.3 g of a 40 wt % potassium hydroxide electrolyte was molded into a molded product in the form of pellets (φ20 mm) under a molding pressure of 2.5 tons. Then, the pellets were inserted to the bottom of a corrosion test container totally made of polyvinyl chloride (FIG. 2), and on the pellets, an SKD-11 plate (thickness: 3 mm, diameter: 20 mm, circular) common as a mold material for a cell cathode material forming, after polished, was placed. Then, a pressing plate made of polyvinyl chloride was placed on the SKD-11 plate, and a screw cock was pressed by a torque wrench under 5N·m, and then the test container was left at rest in a constant temperature constant humidity apparatus at 60° C. under a humidity of 95% for 2 days.

2 days later, the SKD-11 plate was taken out and treated with sodium bicarbonate to sufficiently remove the pellets, and then washed with water and washed with acetone, and dried for one hour. As the corrosion rate, the loss in thickness per year was calculated and regarded as the corrosion rate from the weight change of the SKD-11 plate between before and after the corrosion test.

Example 1

Electrolysis was carried out for 17 days at a current density of 0.55 A/dm$^2$ at an electrolysis temperature of 96° C. by using a manganese sulfate solution having a manganese concentration of 40.0 g/l as an electrolyte feed solution and adjusting the sulfuric acid concentration in the initial stage and the latter stage of the electrolysis to be 25.0 g/l and 40 g/l, respectively. The electrolysis was carried out for 12 days at the concentration of the initial stage and for 5 days at the concentration of the latter stage. Electrolytic manganese dioxide after electrolysis was ground and washed and then neutralized so that the pH of the slurry became from 5.3 to 5.7.

Of the obtained electrolytic manganese dioxide, the alkali potential was 295 mV, FWHM was 2.6°, (110)/(021) was 0.65, and the BET specific surface area was 31.4 m$^2$/g. The middle rate discharge characteristic of the electrolytic manganese dioxide was 104% relative to the middle rate discharge characteristic in Comparative Example 1. The preparation conditions are shown in Table 1, and the results are shown in Table 2.

Further, the 3 to 5 nm pore volume of the obtained electrolytic manganese dioxide was measured and as a result, it was 0.013 cm$^3$/g.

Example 2

Electrolysis was carried out for 15 days at a current density of 0.5 A/dm$^2$ at an electrolysis temperature of 96° C. by using a manganese sulfate solution having a manganese concentration of 40.0 g/l as an electrolyte feed solution and adjusting the sulfuric acid concentration in the initial stage and the latter stage of the electrolysis to be 31.5 g/l and 40 g/l, respectively. The electrolysis was carried out for 13 days at the concentration of the initial stage and for 2 days at the concentration of the latter stage. Electrolytic manganese dioxide after the electrolysis was treated in the same manner as in Example 1. The preparation conditions are shown in Table 1, and the results are shown in Table 2.

Of the obtained electrolytic manganese dioxide, the alkali potential was 292 mV, FWHM was 2.4°, (110)/(021) was 0.72, and the BET specific surface area was 30.3 m²/g. The preparation conditions are shown in Table 1, and the results are shown in Table 2.

Example 3

Electrolysis was carried out for 17 days at a current density of 0.5 A/dm² at an electrolysis temperature of 96° C. by using a manganese sulfate solution having a manganese concentration of 40.0 g/l as an electrolyte feed solution and adjusting the sulfuric acid concentration in the initial stage and the latter stage of the electrolysis to be 31.5 g/l and 38.5 g/l, respectively. The electrolysis was carried out for 12 days at the concentration of the initial stage and for 5 days at the concentration of the latter stage. Electrolytic manganese dioxide after the electrolysis was treated in the same manner as in Example 1. The preparation conditions are shown in Table 1, and the results are shown in Table 2.

Of the obtained electrolytic manganese dioxide, the alkali potential was 307 mV, FWHM was 2.3°, (110)/(021) was 0.66, and the BET specific surface area was 30.3 m²/g.

Example 4

Electrolytic manganese dioxide was obtained in the same manner as in Example 1 except that the current density was 0.5 A/dm², the sulfuric acid concentration in the initial stage of the electrolysis was 35.0 g/l, and the sulfuric acid concentration in the latter stage of the electrolysis was 37.0 g/l.

The preparation conditions are shown in Table 1, and the results are shown in Table 2.

Example 5

Electrolytic manganese dioxide was obtained in the same manner as in Example 1 except that the current density was 0.5 A/dm², the sulfuric acid concentration in the initial stage of the electrolysis was 34.6 g/l, and the sulfuric acid concentration in the latter stage of the electrolysis was 37.0 g/l.

The preparation conditions are shown in Table 1, and the results are shown in Table 2.

Example 6

Electrolytic manganese dioxide was obtained in the same manner as in Example 1 except that the sulfuric acid concentration in the initial stage of the electrolysis was 24.8 g/l.

The preparation conditions are shown in Table 1, and the results are shown in Table 2.

Example 7

Electrolytic manganese dioxide was obtained in the same manner as in Example 1 except that the sulfuric acid concentration in the latter stage of the electrolysis was 39.5 g/l.

The preparation conditions are shown in Table 1, and the results are shown in Table 2.

Example 8

Electrolytic manganese dioxide was obtained in the same manner as in Example 1 except that the sulfuric acid concentration in the initial stage of the electrolysis was 24.8 g/l, and the sulfuric acid concentration in the latter stage of the electrolysis was 39.7 g/l.

The preparation conditions are shown in Table 1, and the results are shown in Table 2.

Example 9

Electrolytic manganese dioxide was obtained in the same manner as in Example 1 except that the sulfuric acid concentration in the initial stage of the electrolysis was 25.4 g/l.

The preparation conditions are shown in Table 1, and the results are shown in Table 2.

Example 10

Electrolytic manganese dioxide was obtained in the same manner as in Example 1 except that the sulfuric acid concentration in the initial stage of the electrolysis was 24.7 g/l.

The preparation conditions are shown in Table 1, and the results are shown in Table 2.

Comparative Example 1

Electrolysis was carried out for 14 days by a conventional common electrolysis method at a current density of 0.5 A/dm² at an electrolysis temperature of 96° C. at a manganese concentration of 40.0 g/l of an electrolysis feed solution at a constant sulfuric acid concentration in the electrolyte of 32.9 g/l through the entire electrolysis period to obtain electrolytic manganese dioxide. The preparation conditions are shown in Table 1 and the results are shown in Table 2.

Of the obtained electrolytic manganese dioxide, the alkali potential was 274 mV, FWHM was 2.3°, the crystallite diameter as calculated from FWHM was 37.3 Å, (110)/(021) was 0.66, and the BET specific surface area was 28.5 m²/g.

Of the manganese dioxide obtained by electrolysis at a constant low sulfuric acid concentration, the crystallite diameter was large, and the alkali potential was low.

Then, the electrolytic manganese dioxide was subjected to the above-described middle rate discharge test in the same manner as in Example 1, and the obtained discharge capacity was taken as 100%.

Further, the 3 to 5 nm pore volume of the obtained electrolytic manganese dioxide was measured and as a result, it was 0.015 cm³/g.

Comparative Example 2

Electrolysis was carried out for 15 days at a current density of 0.5 A/dm² at an electrolysis temperature of 96° C. by using a manganese sulfate solution having a manganese concentration of 40.0 g/l as an electrolyte feed solution and adjusting the sulfuric acid concentration in the initial stage and the latter stage of the electrolysis to be 30 g/l and 50 g/l, respectively. The electrolysis was carried out for 10 days at the concentration of the initial stage and for 5 days at the concentration of the latter stage. The preparation conditions are shown in Table 1, and the results are shown in Table 2.

Of the obtained electrolytic manganese dioxide, the alkali potential was 323 mV, FWHM was 2.5°, (110)/(021) was 0.61, and the BET specific surface area was 29.9 m²/g.

Comparative Example 3

Electrolysis was carried out for 17 days at a current density of 0.5 A/dm² at an electrolysis temperature of 96° C. by using a manganese sulfate solution having a manganese concentration of 40.0 g/l as an electrolyte feed solution and adjusting the sulfuric acid concentration in the initial stage and the latter stage of the electrolysis to be 33 g/l and 65 g/l, respectively. The electrolysis was carried out for 12 days at the concentration of the initial stage and for 5 days at the concentration of the latter stage.

Of the obtained electrolytic manganese dioxide, the alkali potential was 317 mV, FWHM was 2.9°, (110)/(021) was 0.53, and the BET specific surface area was 29.0 m²/g.

Then, the middle rate discharge characteristic of the electrolytic manganese dioxide was measured and as a result, it was 102% relative to Comparative Example 1. The preparation conditions are shown in Table 1, and the results are shown in Table 2.

Further, the 3 to 5 nm pore volume of the obtained electrolytic manganese dioxide was measured and as a result, it was 0.015 cm³/g.

Of the obtained electrolytic manganese dioxide, although the alkali potential was high, the middle rate discharge characteristic was low as compared with the electrolytic manganese dioxide obtained in Examples.

Example 11

Using an electrolytic cell having an internal capacity of 12 L equipped with a heating apparatus and having a titanium plate as an anode and a graphite plate as a cathode suspended so as to face each other.

The electrolysis was carried out using a manganese sulfate solution having a manganese ion concentration of 40 g/l as an electrolyte feed solution at a current density of 0.55 A/dm² by adjusting the sulfuric acid concentration in the initial stage and the latter stage of the electrolysis to be 25.0 g/l and 40 g/l, respectively, totally for 17 days for 12 days at the sulfuric acid concentration of the initial stage and for 5 days at the sulfuric acid concentration of the latter stage.

After the electrolysis, the electrodeposited plate-shape electrolytic manganese dioxide was washed with pure water and separated by a blow, and the obtained massive product was ground by a ball mill to obtain a ground product of electrolytic manganese dioxide.

Then, as neutralization, the electrolytic manganese dioxide ground product was put in a water tank and formed into a 200 g/l slurry, and a 20 wt % sodium hydroxide aqueous solution

TABLE 1

| | Preparation conditions | | | | |
|---|---|---|---|---|---|
| | Manganese concentration in electrolyte feed solution (g/l) | Sulfuric acid concentration in electrolyte (g/l) Initial | Sulfuric acid concentration in electrolyte (g/l) Terminal | Current density (A/dm²) | Number of days for electrolysis (day) After change | Number of days for electrolysis (day) Total days |
|---|---|---|---|---|---|---|
| Ex. 1 | 40.0 | 25.0 | 40.0 | 0.55 | 5 | 17 |
| Ex. 2 | 40.0 | 31.5 | 40.0 | 0.5 | 2 | 15 |
| Ex. 3 | 40.0 | 31.5 | 38.5 | 0.5 | 5 | 17 |
| Ex. 4 | 40.0 | 35.0 | 37.0 | 0.5 | 5 | 17 |
| Ex. 5 | 40.0 | 34.6 | 37.0 | 0.5 | 5 | 17 |
| Ex. 6 | 40.0 | 24.8 | 40.0 | 0.55 | 5 | 17 |
| Ex. 7 | 40.0 | 25.0 | 39.5 | 0.55 | 5 | 17 |
| Ex. 8 | 40.0 | 24.8 | 39.7 | 0.55 | 5 | 17 |
| Ex. 9 | 40.0 | 25.4 | 40.0 | 0.55 | 5 | 17 |
| Ex. 10 | 40.0 | 24.7 | 40.0 | 0.55 | 5 | 17 |
| Comp. Ex. 1 | 40.0 | 32.9 | 32.9 | 0.5 | 0 | 14 |
| Comp. Ex. 2 | 40.0 | 30.0 | 50.0 | 0.5 | 5 | 15 |
| Comp. Ex. 3 | 40.0 | 33.0 | 65.0 | 0.5 | 5 | 17 |

TABLE 2

| | Electrolytic manganese dioxide | | | | | | | | | | | |
|---|---|---|---|---|---|---|---|---|---|---|---|---|
| | Alkali potential (mV) | FWHM (deg.) | (110)/ (021) | (110) spacing (Å) | JIS-pH (—) | Na content (ppm) | Sulfate groups (wt %) | Median diameter (μm) | BET specific surface area (m²/g) | Crystallite diameter (Å) | 3 to 5 nm pore volume (cm³/g) | Middle rate discharge characteristic |
| Ex. 1 | 295 | 2.6 | 0.65 | 4.02 | 3.43 | 2,500 | 1.17 | 39.5 | 31.4 | 31.1 | 0.013 | 104% |
| Ex. 2 | 292 | 2.4 | 0.72 | 4.03 | — | 2,500 | 1.18 | — | 30.3 | 33.4 | — | — |
| Ex. 3 | 307 | 2.3 | 0.66 | 4.04 | — | 2,600 | 1.20 | — | 30.3 | 34.6 | — | — |
| Ex. 4 | 297 | 2.6 | 0.66 | 4.03 | 3.53 | 2,900 | 1.11 | 39.4 | 25 | — | — | — |
| Ex. 5 | 295 | 2.7 | 0.69 | 4.02 | 3.47 | 2,800 | 1.16 | 39.0 | 23 | — | — | — |
| Ex. 6 | 289 | 2.7 | 0.65 | 4.03 | 3.53 | 3,200 | 1.13 | 38.6 | 22.8 | — | — | — |
| Ex. 7 | 286 | 2.8 | 0.59 | 4.02 | 3.49 | 3,000 | 1.14 | 38.2 | 25.7 | — | — | — |
| Ex. 8 | 283 | 2.6 | 0.50 | 4.01 | 3.49 | 2,900 | 1.11 | 39.5 | 25.2 | — | — | — |
| Ex. 9 | 305 | 2.9 | 0.56 | 4.03 | 3.46 | 3,100 | 1.09 | 40.2 | 29.6 | — | — | — |
| Ex. 10 | 287 | 2.7 | 0.62 | 4.00 | 3.54 | 2,900 | 1.09 | 40.3 | 27.4 | — | — | — |
| Comp. Ex. 1 | 274 | 2.3 | 0.66 | 4.03 | — | — | — | — | 28.5 | 37.3 | 0.015 | 100% |
| Comp. Ex. 2 | 323 | 2.5 | 0.61 | 4.04 | — | — | — | — | 29.9 | 32.4 | — | — |
| Comp. Ex. 3 | 317 | 2.9 | 0.53 | 4.04 | — | — | — | — | 29.0 | 29.6 | 0.015 | 102% |

* "—" in Table 2 represents not measured.

was added with stirring so that the pH of the slurry became 4.5, and stirring was carried out for 60 minutes.

Then, stirring was terminated, and an operation of leaving the content at rest for 15 minutes, removing the supernatant portion by decantation, and newly adding water to carry out washing, was carried out twice as washing treatment. Then, separation by filtration and drying were carried out to obtain an electrolytic manganese dioxide powder.

With respect to the obtained electrolytic manganese dioxide, the preparation conditions are shown in Table 3, and the results are shown in Table 4.

Example 12

Electrolysis was carried out in the same manner as in Example 11 except that a manganese sulfate solution having a manganese ion concentration of 40.3 g/l was used as an electrolyte feed solution, the sulfuric acid concentration in the initial stage and the latter stage of the electrolysis was adjusted to be 23.4 g/l and 40.0 g/l, respectively, and the electrolysis was carried out totally for 10 days for 5 days at the sulfuric acid concentration of the initial stage and for 5 days at the sulfuric acid concentration of the latter stage.

After the electrolysis, an electrolytic manganese dioxide powder was obtained in the same manner as in Example 11 except that the neutralization was carried out so that the pH of the slurry became 2.8.

With respect to the obtained electrolytic manganese dioxide, the preparation conditions are shown in Table 3, and the results are shown in Table 4.

Example 13

Electrolysis was carried out in the same manner as in Example 11 except that a manganese sulfate solution having a manganese ion concentration of 40.1 g/l was used as an electrolyte feed solution, the sulfuric acid concentration in the initial stage and the latter stage of the electrolysis was adjusted to be 23.2 g/l and 39.6 g/l, respectively, and the electrolysis was carried out totally for 10 days for 5 days at the sulfuric acid concentration of the initial stage and for 5 days at the sulfuric acid concentration of the latter stage.

After the electrolysis, an electrolytic manganese dioxide powder was obtained in the same manner as in Example 11 except that the neutralization was carried out so that the pH of the slurry became 2.8.

With respect to the obtained electrolytic manganese dioxide, the preparation conditions are shown in Table 3, and the results are shown in Table 4.

Example 14

Electrolysis was carried out in the same manner as in Example 11 except that a manganese sulfate solution having a manganese ion concentration of 40.1 g/l was used as an electrolyte feed solution, the sulfuric acid concentration in the initial stage and the latter stage of the electrolysis was adjusted to be 24.9 g/l and 36.2 g/l, respectively, and the electrolysis was carried out totally for 10 days for 5 days at the sulfuric acid concentration of the initial stage and for 5 days at the sulfuric acid concentration of the latter stage.

After the electrolysis, an electrolytic manganese dioxide powder was obtained in the same manner as in Example 11 except that the neutralization was carried out so that the pH of the slurry became 2.79.

With respect to the obtained electrolytic manganese dioxide, the preparation conditions are shown in Table 3, and the results are shown in Table 4.

Example 15

Electrolysis was carried out in the same manner as in Example 11 except that a manganese sulfate solution having a manganese ion concentration of 39.4 g/l was used as an electrolyte feed solution, the sulfuric acid concentration in the initial stage and the latter stage of the electrolysis was adjusted to be 28.6 g/l and 36.5 g/l, respectively, and the electrolysis was carried out totally for 10 days for 5 days at the sulfuric acid concentration of the initial stage and for 5 days at the sulfuric acid concentration of the latter stage.

After the electrolysis, an electrolytic manganese dioxide powder was obtained in the same manner as in Example 11 except that the neutralization was carried out so that the pH of the slurry became 2.79.

With respect to the obtained electrolytic manganese dioxide, the preparation conditions are shown in Table 3, and the results are shown in Table 4.

Example 16

Electrolysis was carried out in the same manner as in Example 11 except that a manganese sulfate solution having a manganese ion concentration of 40.0 g/l was used as an electrolyte feed solution, the sulfuric acid concentration in the initial stage and the latter stage of the electrolysis was adjusted to be 25.0 g/l and 40.0 g/l, respectively, and the electrolysis was carried out totally for 17 days for 12 days at the sulfuric acid concentration of the initial stage and for 5 days at the sulfuric acid concentration of the latter stage.

After the electrolysis, an electrolytic manganese dioxide powder was obtained in the same manner as in Example 11 except that the neutralization was carried out so that the pH of the slurry became 2.6.

With respect to the obtained electrolytic manganese dioxide, the preparation conditions are shown in Table 3, and the results are shown in Table 4.

Example 17

Electrolysis was carried out in the same manner as in Example 11 except that a manganese sulfate solution having a manganese ion concentration of 40.0 g/l was used as an electrolyte feed solution, the sulfuric acid concentration in the initial stage and the latter stage of the electrolysis was adjusted to be 25.2 g/l and 40.0 g/l, respectively, and the electrolysis was carried out totally for 17 days for 12 days at the sulfuric acid concentration of the initial stage and for 5 days at the sulfuric acid concentration of the latter stage.

After the electrolysis, an electrolytic manganese dioxide powder was obtained in the same manner as in Example 11 except that the neutralization was carried out so that the pH of the slurry became 2.6.

With respect to the obtained electrolytic manganese dioxide, the preparation conditions are shown in Table 3, and the results are shown in Table 4.

Example 18

Electrolysis was carried out in the same manner as in Example 11 except that a manganese sulfate solution having a manganese ion concentration of 40.0 g/l was used as an electrolyte feed solution, the sulfuric acid concentration in the initial stage and the latter stage of the electrolysis was adjusted to be 24.6 g/l and 39.5 g/l, respectively, and the electrolysis was carried out totally for 17 days for 12 days at the sulfuric acid concentration of the initial stage and for 5 days at the sulfuric acid concentration of the latter stage.

After the electrolysis, an electrolytic manganese dioxide powder was obtained in the same manner as in Example 11 except that the neutralization was carried out so that the pH of the slurry became 2.6.

With respect to the obtained electrolytic manganese dioxide, the preparation conditions are shown in Table 3, and the results are shown in Table 4.

Example 19

Electrolysis was carried out in the same manner as in Example 11 except that a manganese sulfate solution having a manganese ion concentration of 40.0 g/l was used as an electrolyte feed solution, the sulfuric acid concentration in the initial stage and the latter stage of the electrolysis was adjusted to be 25.0 g/l and 39.6 g/l, respectively, and the electrolysis was carried out totally for 17 days for 12 days at the sulfuric acid concentration of the initial stage and for 5 days at the sulfuric acid concentration of the latter stage.

After the electrolysis, an electrolytic manganese dioxide powder was obtained in the same manner as in Example 11 except that the neutralization was carried out so that the pH of the slurry became 2.6.

With respect to the obtained electrolytic manganese dioxide, the preparation conditions are shown in Table 3, and the results are shown in Table 4.

Example 20

The procedure from the electrolysis to the grinding was carried out in the same manner as in Example 11 to obtain a ground product of electrolytic manganese dioxide.

Then, as washing treatment with water, an operation of putting the electrolytic manganese dioxide ground product in a water tank to prepare a 500 g/l slurry, stirring the slurry for 20 minutes, leaving the content at rest for 15 minutes, removing the supernatant portion by decantation, and newly adding water to carry out washing, was carried out three times. Then, as the neutralization, a 20 wt % sodium hydroxide aqueous solution was added to the slurry so that the pH of the slurry became 5.6, followed by stirring for 60 minutes, and then separation by filtration and drying were carried out to obtain an electrolytic manganese dioxide powder.

With respect to the obtained electrolytic manganese dioxide, the preparation conditions are shown in Table 3, and the results are shown in Table 4.

Comparative Example 4

Electrolysis was carried out in the same manner as in Example 11 except that the sulfuric acid concentration in the initial stage of the electrolysis was the same as in Example 11 and the sulfuric acid concentration in the latter stage of the electrolysis was adjusted to be 65 g/l, and the electrolysis was carried out totally at a current density of 0.57 A/dm² for 16 days for 12 days at the concentration of the initial stage and for 4 days at the concentration of the latter stage, to obtain a ground product of electrolytic manganese dioxide.

Then, an electrolytic manganese dioxide powder was obtained by the same treatment as in Example 20.

With respect to the obtained electrolytic manganese dioxide, the preparation conditions are shown in Table 3, and the results are shown in Table 4.

In Comparative Example 4, although the alkali potential was high, both high rate discharge characteristic and middle rate discharge characteristic were low.

Comparative Example 5

An electrolytic manganese dioxide powder was obtained in the same manner as in Example 20 except that the electrolysis was carried out in the same manner as in Example 11 except that a manganese sulfate solution having a manganese ion concentration of 40 g/l was used as an electrolyte feed solution, and the electrolysis was carried out for 14 days by adjusting the composition of the electrolyte from the initiation of the electrolysis to the termination of the electrolysis to have a manganese ion concentration of 26 g/l and a sulfuric acid concentration of 33 g/l.

With respect to the obtained electrolytic manganese dioxide, the preparation conditions are shown in Table 3, and the results are shown in Table 4.

This Comparative Example corresponds to electrolytic manganese dioxide prepared by usual preparation conditions, and in this Comparative Example, both high rate discharge characteristic and middle rate discharge characteristic were low.

Comparative Example 6

An electrolytic manganese dioxide powder was obtained in the same manner as in Example 11 except that the electrolysis conditions were the same as in Comparative Example 5, and in the treatment after the electrolysis, the pH of the slurry at the time of the neutralization was adjusted to be 4.2.

With respect to the obtained electrolytic manganese dioxide, the preparation conditions are shown in Table 3, and the results are shown in Table 4.

Comparative Example 7

An electrolytic manganese dioxide powder was obtained in the same manner as in Comparative Example 5 except that no neutralization was carried out.

With respect to the obtained electrolytic manganese dioxide, the preparation conditions are shown in Table 3, and the results are shown in Table 4.

TABLE 3

| | Manganese concentration in electrolyte feed solution (g/l) | Sulfuric acid concentration in electrolyte (g/l) | | Current density (A/dm²) | Number of days for electrolysis (day) | | Slurry pH |
|---|---|---|---|---|---|---|---|
| | | Initial | Terminal | | After change | Total days | |
| Ex. 11 | 40.0 | 25.0 | 40.0 | 0.55 | 5 | 17 | 4.5 |
| Ex. 12 | 40.3 | 23.4 | 40.0 | 0.55 | 5 | 10 | 2.8 |
| Ex. 13 | 40.1 | 23.2 | 39.6 | 0.55 | 5 | 10 | 2.8 |

TABLE 3-continued

|  | Manganese concentration in electrolyte feed solution (g/l) | Sulfuric acid concentration in electrolyte (g/l) Initial | Sulfuric acid concentration in electrolyte (g/l) Terminal | Current density (A/dm²) | Number of days for electrolysis (day) After change | Number of days for electrolysis (day) Total days | Slurry pH |
|---|---|---|---|---|---|---|---|
| Ex. 14 | 40.1 | 24.9 | 36.2 | 0.55 | 5 | 10 | 2.79 |
| Ex. 15 | 39.4 | 28.6 | 36.5 | 0.55 | 5 | 10 | 2.79 |
| Ex. 16 | 40.0 | 25.0 | 40.0 | 0.55 | 5 | 17 | 2.6 |
| Ex. 17 | 40.0 | 25.2 | 40.0 | 0.55 | 5 | 17 | 2.6 |
| Ex. 18 | 40.0 | 24.6 | 39.5 | 0.55 | 5 | 17 | 2.6 |
| Ex. 19 | 40.0 | 25.0 | 39.6 | 0.55 | 5 | 17 | 2.6 |
| Ex. 20 | 40.0 | 25.0 | 40.0 | 0.55 | 5 | 17 | 5.6 |
| Comp. Ex. 4 | 40.0 | 25.0 | 65.0 | 0.57 | 4 | 16 | 5.6 |
| Comp. Ex. 5 | 40.0 | 33.0 | 33.0 | 0.57 | — | 14 | 5.6 |
| Comp. Ex. 6 | 40.0 | 33.0 | 33.0 | 0.57 | — | 14 | 4.2 |
| Comp. Ex. 7 | 40.0 | 33.0 | 33.0 | 0.57 | — | 14 | — |

* In Table 3, "—" of the slurry pH in Comp. Ex. 7 represents not measured.

TABLE 4

|  | Alkali potential (mV) | FWHM (°) | (110)/(021) (—) | (110) interplaner spacing (Å) | JIS-pH (—) | Na content (ppm) | Sulfate groups (wt %) | Median diameter (mm) | BET (m²/g) | High rate discharge characteristic | Middle rate discharge characteristic | Corrosion rate (mm/year) |
|---|---|---|---|---|---|---|---|---|---|---|---|---|
| Ex. 11 | 297 | 2.8 | 0.55 | 4.01 | 1.96 | 280 | 1.17 | 42.2 | 27.2 | 108% | 104% | <0.01 |
| Ex. 12 | 309 | 2.7 | 0.63 | 4.04 | 1.93 | 420 | 1.26 | 32.6 | 24.9 | 118% | 115% | — |
| Ex. 13 | 306 | 2.6 | 0.68 | 4.03 | 1.90 | 350 | 1.24 | 31.9 | 25.5 | 119% | 112% | — |
| Ex. 14 | 299 | 2.5 | 0.72 | 4.03 | 1.98 | 440 | 1.26 | 31.3 | 25.6 | 124% | 108% | — |
| Ex. 15 | 289 | 2.5 | 0.63 | 4.03 | 2.01 | 340 | 1.27 | 33.2 | 26.5 | 106% | 113% | — |
| Ex. 16 | 293 | 2.7 | 0.55 | 4.02 | 3.53 | 270 | 1.20 | 40.3 | 27.2 | 110% | 105% | — |
| Ex. 17 | 295 | 2.7 | 0.60 | 4.01 | 3.47 | 260 | 1.16 | 39.0 | 25.3 | — | — | — |
| Ex. 18 | 289 | 2.9 | 0.52 | 4.02 | 3.53 | 220 | 1.13 | 38.6 | 26.8 | — | — | — |
| Ex. 19 | 286 | 2.7 | 0.66 | 4.01 | 3.49 | 220 | 1.14 | 38.2 | 24.6 | 113% | 105% | — |
| Ex. 20 | 298 | 2.7 | 0.59 | 4.00 | 3.50 | 2,700 | 1.11 | 41.0 | 27.7 | 100% | 100% | <0.01 |
| Comp. Ex. 4 | 326 | 2.8 | 0.59 | 4.03 | 3.47 | 3,700 | 1.16 | 40.8 | 26.0 | 98% | 97% | <0.01 |
| Comp. Ex. 5 | 277 | 2.7 | 0.62 | 3.99 | 3.62 | 2,600 | 1.18 | 42.0 | 26.3 | 93% | 97% | <0.01 |
| Comp. Ex. 6 | 257 | 2.8 | 0.57 | 4.00 | 2.17 | 720 | 1.08 | 39.1 | 26.8 | 99% | 100% | <0.01 |
| Comp. Ex. 7 | 281 | 2.8 | 0.49 | 4.01 | 1.44 | 360 | 1.27 | 39.0 | 25.4 | — | — | >0.1 |

* In Table 4, "—" represents not measured.

The present invention has been described in detail with reference to specific embodiments, but, it is obvious for the person skilled in the art that various changes and modifications are possible without departing from the intension and the scope of the present invention.

The entire disclosures of Japanese Patent Application No. 2009-193160 filed on Aug. 24, 2009 and Japanese Patent Application No. 2009-278237 filed on Dec. 8, 2009 including specifications, claims, drawings and summaries are incorporated herein by reference in their entireties.

INDUSTRIAL APPLICABILITY

Electrolytic manganese dioxide of the present invention has both high potential and high packing efficiency, and can be used for an alkali-manganese dry cell as a cathode active material for an alkali-manganese dry cell excellent in the discharge characteristics particularly the middle rate discharge characteristic, and further, as a cathode active material excellent in both the discharge characteristics of high rate discharge characteristic and middle rate discharge characteristic and which is less corrosive. Thus, the present invention is industrially highly valuable.

REFERENCE SYMBOLS

1: Upper fixture
2: KOH aqueous solution
3: Porous plate
4: Separator
5: Ni lead
6: Ni plate
7: Cathode mixture
8: Zinc anode
9: Silicon rubber stopper
10: Screw cock made of polyvinyl chloride
11: Push plate made of polyvinyl chloride
12: Metal material plate (SKD-11 plate)
13: Pellets
14: Corrosion test container made of polyvinyl chloride (main body)

The invention claimed is:

1. Electrolytic manganese dioxide wherein the potential as measured in a 40 wt % KOH aqueous solution by using a mercury/mercury oxide reference electrode as a standard, is at least 280 mV and less than 310 mV, the full width at half maximum (FWHM) of the (110) plane in the XRD measurement using CuKα radiation as the light source is at least 2.2° and at most 2.9°, and the (110)/(021) peak intensity ratio in the X-ray diffraction peaks is at least 0.50 and at most 0.80;

said electrolytic manganese dioxide having been produced by electrolysis in an aqueous solution of sulfuric acid/manganese sulfate mixture, wherein the concentration of sulfuric acid at the initiation of the electrolysis is at least 20 g/L and at most 35 g/L, and the concentration of sulfuric acid at the termination of the electrolysis is higher than 35 g/L and at most 40 g/L;

wherein a sulfate group content of the obtained electrolytic manganese dioxide is less than 1.30 wt %;

wherein a median diameter is at least 30 µm and at most 50 µm; and wherein the 3 to 5 nm pore volume is at least 0.012 cm$^3$/g.

2. The electrolytic manganese dioxide according to claim 1, wherein the (110) interplanar spacing in the X-ray diffraction peaks is at least 4.00 Å and at most 4.06 Å.

3. The electrolytic manganese dioxide according to claim 1, wherein a JIS-pH (JIS K1467) is at least 1.5 and less than 2.6, and a sodium content is at least 0.02 wt % and less than 0.10 wt %.

4. The electrolytic manganese dioxide according to claim 1, wherein a BET specific surface area is at least 20 m$^2$/g and at most 50 m$^2$/g.

5. A method for producing the electrolytic manganese dioxide according to claim 1 by electrolysis in an aqueous solution of sulfuric acid/manganese sulfate mixture, characterized in that the concentration of sulfuric acid in the electrolyte at the termination of the electrolysis is higher than the concentration of sulfuric acid in the electrolyte at the initiation of the electrolysis and that the concentration of sulfuric acid at the initiation of the electrolysis is at least 20 g/L and at most 35 g/L, and the concentration of sulfuric acid at the termination of the electrolysis is higher than 35 g/L and at most 40 g/L.

6. The method for producing electrolytic manganese dioxide according to claim 5, characterized in that manganese dioxide is electrodeposited in a sulfuric acid/manganese sulfate bath wherein the concentration of sulfuric acid in the electrolyte at the termination of the electrolysis is higher than the concentration of sulfuric acid in the electrolyte at the initiation of the electrolysis, the obtained electrolytic manganese dioxide is ground to obtain a slurry, and the slurry is neutralized to a pH of at least 2.0 and at most 5.0, then washed and dried.

7. The method for producing electrolytic manganese dioxide according to claim 6, wherein the washing is carried out until the alkali metal content in the electrolytic manganese dioxide becomes at least 0.02 wt % and less than 0.10 wt %.

8. The method for producing electrolytic manganese dioxide according to claim 6, wherein the washing is carried out until the sulfate group content in the electrolytic manganese dioxide becomes less than 1.30 wt %.

9. A cathode active material for an electric cell containing the electrolytic manganese dioxide as defined in claim 1.

10. An electric cell containing the cathode active material for an electric cell as defined in claim 9.

11. A battery comprising the electrolytic manganese dioxide according to claim 1, wherein the potential as measured in a 40 wt % KOH aqueous solution by using a mercury/mercury oxide reference electrode as a standard, is at least 280 mV and less than 310 mV, the full width at half maximum (FWHM) of the (110) plane in the XRD measurement using CuKα radiation as the light source is at least 2.2° and at most 2.9°, and the (110)/(021) peak intensity ratio in the X-ray diffraction peaks is at least 0.50 and at most 0.80, and the relative discharge capacity of the battery at an electric current of 10 mA/g at a cut-off voltage of 0.9 V is at least 104%;

said electrolytic manganese dioxide having been produced by electrolysis in an aqueous solution of sulfuric acid/manganese sulfate mixture, wherein the concentration of sulfuric acid at the initiation of the electrolysis is at least 20 g/L and at most 35 g/L, and the concentration of sulfuric acid at the termination of the electrolysis is higher than 35 g/L and at most 40 g/L.

* * * * *